United States Patent
Suzuki et al.

(10) Patent No.: US 6,735,986 B2
(45) Date of Patent: May 18, 2004

(54) APPARATUS FOR PREVENTING REDEPOSITION OF SILICA DURING FLAME SEVERING

(75) Inventors: Shinji Suzuki, Annaka (JP); Hideo Hirasawa, Annaka (JP); Tadakatsu Shimada, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/367,876

(22) Filed: Feb. 19, 2003

(65) Prior Publication Data

US 2003/0126891 A1 Jul. 10, 2003

Related U.S. Application Data

(60) Division of application No. 09/575,369, filed on May 22, 2000, now Pat. No. 6,532,776, which is a continuation-in-part of application No. 09/105,215, filed on Jun. 26, 1998, now abandoned.

(30) Foreign Application Priority Data

Jun. 27, 1997 (JP) .............................................. 9-171439

(51) Int. Cl.[7] ........................................... C03B 23/043
(52) U.S. Cl. ............................ 65/501; 65/152; 65/269; 65/270; 65/530; 65/113; 65/536
(58) Field of Search ......................... 65/152, 269, 270, 65/501, 530, 113, 536

(56) References Cited

U.S. PATENT DOCUMENTS

| | | | |
|---|---|---|---|
| 1,832,039 A | * 11/1931 | Millar | 65/285 |
| 3,188,191 A | * 6/1965 | Farnsworth | 65/113 |
| 3,819,249 A | 6/1974 | Borner | |
| 3,825,319 A | 7/1974 | Cook | |
| 4,118,618 A | * 10/1978 | Gauthier et al. | 219/121.58 |
| 4,195,980 A | 4/1980 | Sterling | |
| 4,407,667 A | 10/1983 | LeNoane | |
| 4,629,485 A | 12/1986 | Berkey | |
| 4,842,635 A | 6/1989 | Spaapen et al. | |
| 5,211,730 A | 5/1993 | Kanamori | |
| 5,627,505 A | * 5/1997 | Iwaszek | 335/302 |
| 5,674,305 A | 10/1997 | Ohga | |
| 5,711,782 A | 1/1998 | Okamura | |
| 5,755,849 A | 5/1998 | Hoshino et al. | |
| 5,922,098 A | 7/1999 | Tsuneishi et al. | |
| 5,970,750 A | 10/1999 | Humbert et al. | |
| 6,134,922 A | 10/2000 | Shimada et al. | |

FOREIGN PATENT DOCUMENTS

| | | | |
|---|---|---|---|
| DE | 85234 | * 2/1896 | 65/269 |
| EP | 0 432 791 A1 | 6/1991 | |
| EP | 0 519 479 A2 | 12/1992 | |
| EP | 0 525 681 A1 | 2/1993 | |
| EP | 0 612 700 A1 | 8/1994 | |
| FR | 2 589 461 A1 | 5/1987 | |
| GB | 2 307 907 A | 6/1997 | |
| JP | 3115131 A | 5/1991 | |
| JP | 5-70165 | 3/1993 | |

* cited by examiner

*Primary Examiner*—John Hoffmann
(74) *Attorney, Agent, or Firm*—McDermott, Will & Emery

(57) ABSTRACT

A method for fusing an optical fiber preform comprises fusing the preform while blowing an oxidative gas against the preform to be fused from upper and lower directions of a fusing burner unit. An apparatus for carrying out the method includes a plurality of nozzles for preventing deposition of silica cloud, which are each set at an angle, θ, of blowing the oxidative gas relative to the preform being drawn such $20° \leq \theta \leq 60°$.

2 Claims, 3 Drawing Sheets

APPARATUS FOR PREVENTING REDEPOSITION OF SILICA DURING FLAME SEVERING

This application is a divisional of application Ser. No. 09/575,369 filed May 22, 2000 U.S. Pat. No. 6,532,776 which is a continuation-in-part of application Ser. No. 09/105,215 filed Jun. 26, 1998 now abandoned.

FIELD OF THE INVENTION

This invention relates to a method and an apparatus for making an optical fiber preform, and more particularly, to an improved method and apparatus for making an optical fiber preform, wherein a large-sized mother ingot for optical fiber is thermally drawn along a vertical direction and is melted to continuously obtain preform rods with tapered portions at opposite ends thereof, and wherein deposition of a so-called silica cloud, generated in the course of melting is effectively prevented.

DESCRIPTION OF THE PRIOR ART

An optical fiber preform is obtained by drawing a mother ingot to produce a preform having a given diameter, depending on a fiber drawing machine to be used. If the ingot has a bend, such a bend is corrected during the course of drawing. Thereafter, a dummy glass is welded to the preform at opposite ends thereof, followed by drawing with a fiber drawing machine. An optical fiber made of silica glass, which has flaws in the surface thereof becomes ver embrittled. Accordingly, if an optical fiber is flawed at the time of fiber drawing of an optical fiber preform, its strength is reduced. For the purpose of suppressing the occurrence of flaws, fire polishing has usually been effected, wherein after finishing with a given diameter, an optical fiber preform is exposed to a weak flame to remove foreign matter from the outer surfaces thereof.

As is known in the art, when a preform is heated until its surface temperature reaches about 2000° C., part of the silica glass sublimates into SiO. This SiO combines with moisture present in the surrounding atmosphere and is converted again in to fine glass particles, followed by re-deposition onto the surface of the preform. It is also known that when silica glass is fused (i.e. melted) by means of a flame, a so-called silica cloud appears just outside the strongly heated portion. This cloud has the possibility of causing flaws in the fiber surface during fiber drawing. Thus, it is necessary that the cloud be removed prior to fiber drawing. The cloud may be removed by slowly heating the preform rod with a relatively weak flame. In this connection, however, the heating of the preform rod may become inadequate, depending on the amounts of gases used and the moving speed of a burner. This leads to great strain being left in the preform rod, with the great possibility that only a slight degree of impact applied to the preform rod will result in cracking. On the other hand, when the preform rod is heated to an extent greater than required, residual strain is reduced, but the band-shaped silica cloud reappears.

To avoid this, it is common to measure a residual strain by use of a strain gauge, and to determine fire polishing conditions in such a way that gas conditions and burner moving speed conditions, under which a residual strain is at a level involving no problem therein, and also gas conditions and burner moving speed conditions, which are determined by appearance inspection, are determined by trial and error. As a matter of course, these conditions differ depending on the diameter of the perform and the nature of the individual burner. Accordingly, determining these conditions has, in fact, required much labor and time. In addition, in view of the results of the determination of these conditions, it is required that, in order not to cause silica cloud to develop, a relatively weak flame be used so that the surface temperature of a perform is not raised, and that in order to make a small residual strain, the moving speed of a burner sufficiently below to permit heat to be satisfactorily transmitted to the inside of the preform. These conditions require much time. More particularly, fusion of a preform by conventional means allows a silica cloud to be deposited, and once again requires fire polishing at a final stage. The work of determining the final-stage fire polishing conditions further requires much time and labor.

SUMMARY OF THE INVENTION

It is therefore an object of the invention to provide a method for melting an optical fiber preform to form preform rods, while preventing deposition of a silica cloud thereon. A method and apparatus according to the present invention provides for a continuous process of manufacturing preform rods, which have tapered portions at opposite ends thereof, by drawing a large-sized mother ingot in an electric furnace in a vertical direction, and subsequently melting the drawn preform in such a manner as to prevent deposition of a silica cloud on the preform rods.

It is another object of the invention to provide an apparatus for melting an optical fiber preform to form preform rods, whereby deposition of a silica cloud on a tapered portion at opposite ends of preform rods can be effectively prevented.

According to one embodiment according to the present invention, there is provided a method for melting an optical fiber preform, which is obtained by drawing a large-sized mother ingot along a vertical direction, under heating conditions, and subsequently melting the resultant preform by use of a fusing burner to form preform rods having tapered portions at opposite ends thereof, wherein the preform is melted while blowing an oxygen gas from upper and lower sides relative to the fusing burner and whereby a silica cloud is prevented from deposition on the tapered portion of the preform rods.

According to another embodiment of the invention, there is also provided an apparatus for melting an optical fiber preform, which comprises a drawing unit having a rotary chuck, a feeding means, an electric furnace, and a drawing chuck, and fusing unit associated in connection with the drawing unit and having a fusing burner and a fusion chuck, wherein the fusing unit includes a plurality of nozzles located above and below the fusing burner unit and capable of blowing an oxidative gas against a preform being melted at an angle, θ, of blowing relative to the length of the preform, which is in the range of 20°#θ#60°.

DESCRIPTION OF THE PREFERRED EMBODIMENTS

Figure 1:
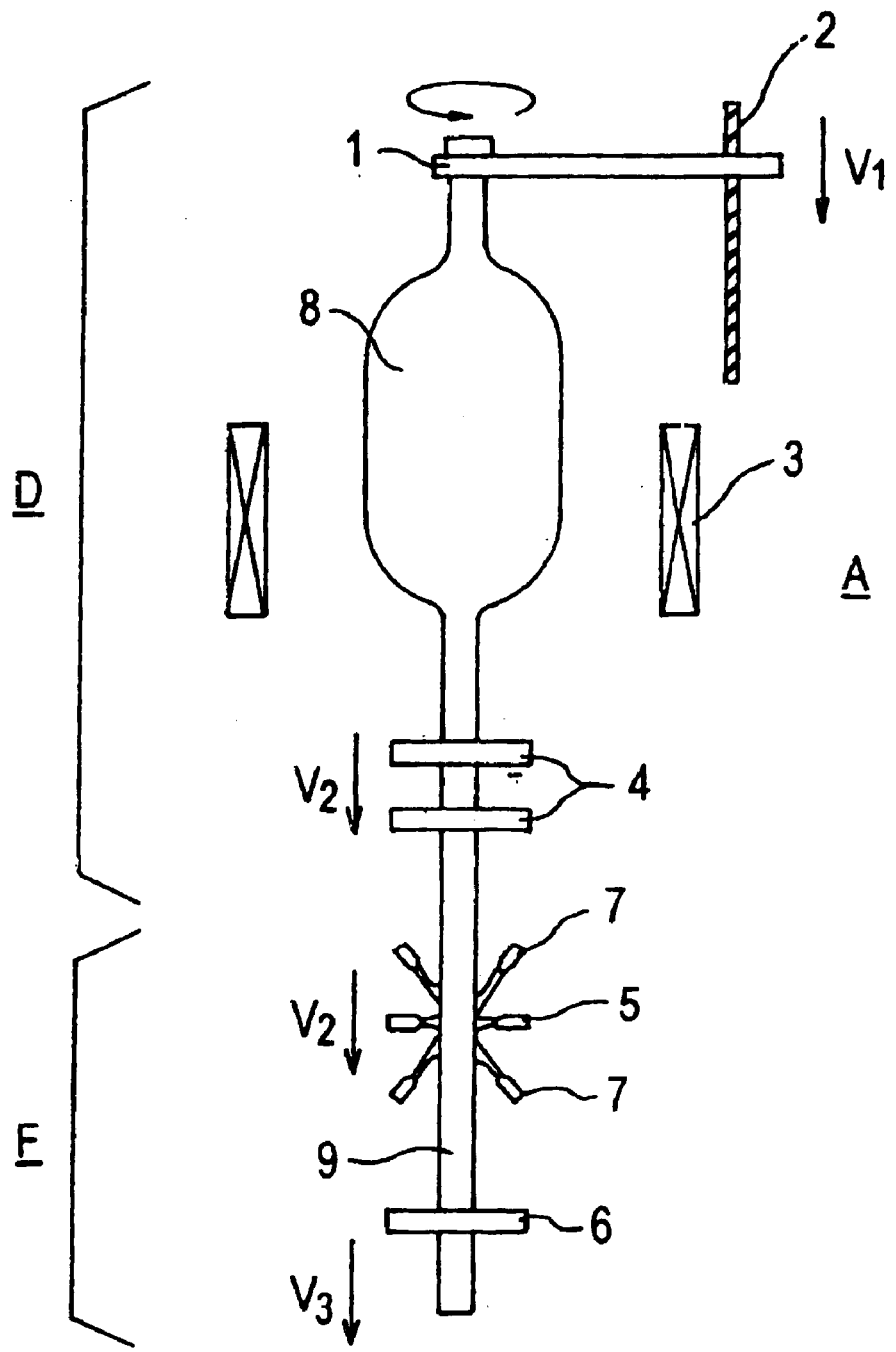
FIG. 1 is a schematic longitudinal sectional view illustrating an apparatus for melting an optical fiber preform according to the present invention.

Reference in now made to the accompanying drawings and particularly, to FIG. 1. In FIG. 1, there is shown an apparatus A of manufacturing a preform. The apparatus A includes a drawing unit D and a fusing unit F. The drawing unit D has a rotary chuck 1, a feed mechanism 2, an electric furnace 3, and a drawing chuck 4 as shown. The fusing mechanism F includes fusing burners 5, and chuck 6, and nozzles 7 for preventing deposition of a silica cloud.

In operation, an ingot 8 made of silica glass is fixedly attached to the rotary chuck 1 and fed to the electric furnace 3 by means of the feed mechanism 2 at a feed rate $V_1$. In the furnace 3, the ingot is heated and softened, under which condition it is drawn by movement of the drawing chuck 4 at a take-up rate $V_2$. The resultant preform 9 being moved at the rate of $V_2$ is fused to a given length by means of a fusing chuck 6, which is moved at a fusing rate $V_3$, to obtain a product preform rod. At this time, the fusing burners 5 and the nozzles 7 are both moved at the rate of $V_2$, which is equal to the take-up rate, while blowing an oxidative gas against the preform being drawn. The rates $V_1$, $V_2$ and $V_3$ are set so that $V_2 > V_1$ and $V_3 > V_2$.

Figure 2:
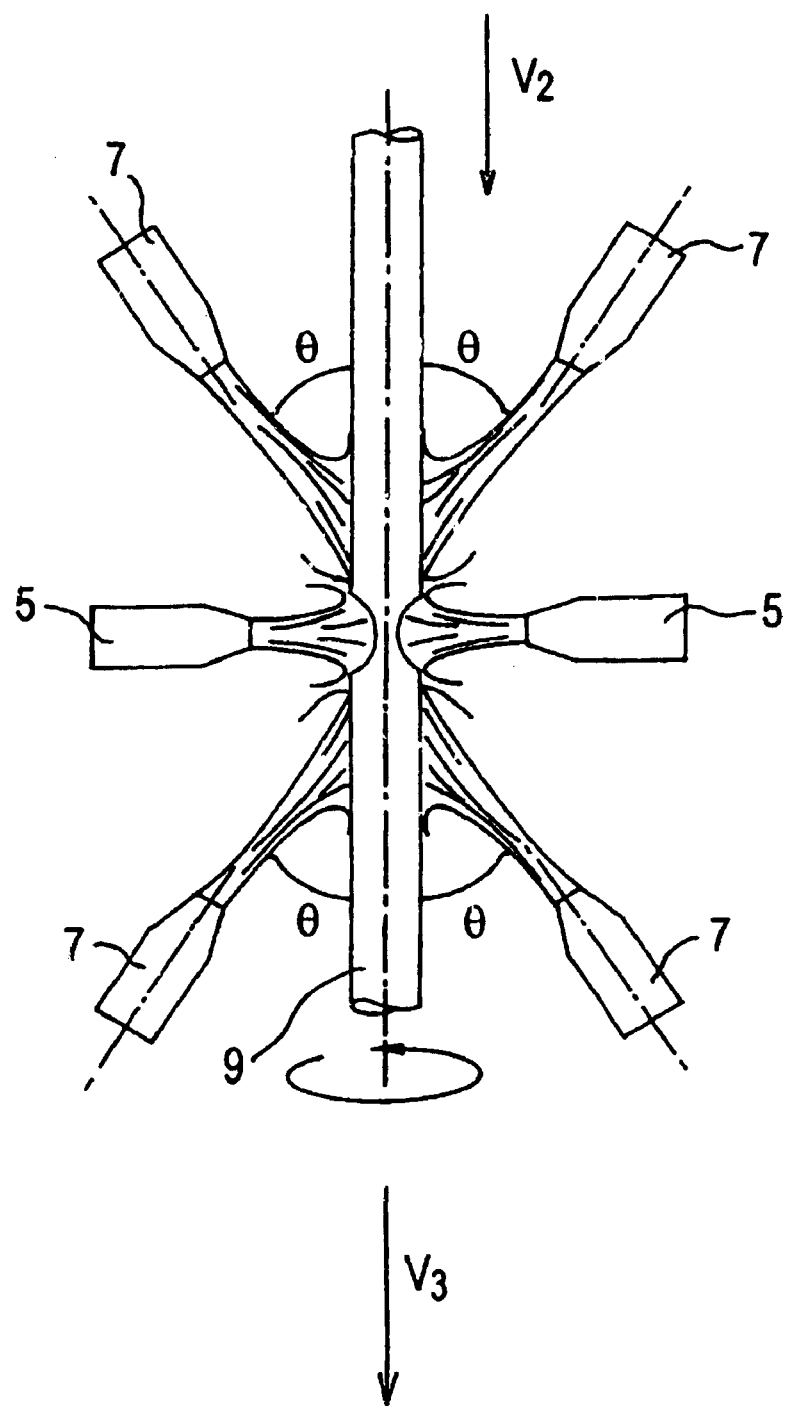
FIG. 2 is a schematic, enlarged, longitudinal sectional view showing a fusing unit of the apparatus of FIG. 1.

FIG. 2 is a view showing the detail of the fusing unit F of the apparatus A, by which the preform 9 is fused into produce preform rods having a given length. As will be seen from the figure, two fusing burners 5 are located in face-to-face relation via the preform 9, and four nozzles 7 are each arranged at a reset angle, θ, between the flow of an oxidative gas and the preform being drawn. This angle should be in the range of $20° \leq θ \leq 60°$. If this blowing angle is less than 20°, the nozzles may contact the preform being rotated in view of the structural arrangement of the apparatus. On the other hand, when the angle exceeds 60°, a greater amount of a gas used to the blowing may be necessary for attaining a deposition-preventing effect similar to that attained at the defined angle.

It is known that the sublimation of silica glass proceeds rapidly in a reductive atmosphere. In contrast, the sublimation of SiO can be suppressed when a heating atmosphere consists of an oxidative gas. Examples of the oxidative gas used in the practice of the invention includes oxygen, air, or an oxygen-rich oxyhydrogen flame. The amount of a gas being blown against the preform is in the range of 1/5 to 1/2 of the amount of a gas supplied to the fusing burner. If the amount is smaller, a satisfactory deposition preventing effect may not be expected. On the other hand, if the amount is in excess, the burner flame may be undesirably disturbed, causing the preform to be heated unsatisfactorily.

It will be noted that smaller-size burners may be used as the nozzles.

In the method of the invention wherein product rods having a tapered portion at opposite sides thereof can be continuously manufactured by thermally drawing, into a preform, a large-sized silica glass ingot 8 having an outer diameter, for example, of 100 to 300 mm in a electric furnace 3 in a vertical direction, and subsequently fused, an oxidative gas is blown against the preform from upper and lower directions of fusing burners 5. As described before, when the surface temperature of the preform reaches about 2000° C., part of the silica glass is sublimated into SiO. This SiO combines with moisture in the surrounding atmosphere and is redeposited on the preform surface in the form of fine particles of silica. To avoid this, an oxidative gas is blown against the preform from upper and lower directions of the burner flame to blow the SiO off. Thus, the re-deposition of glass fine particles is prevented.

Figure 3:
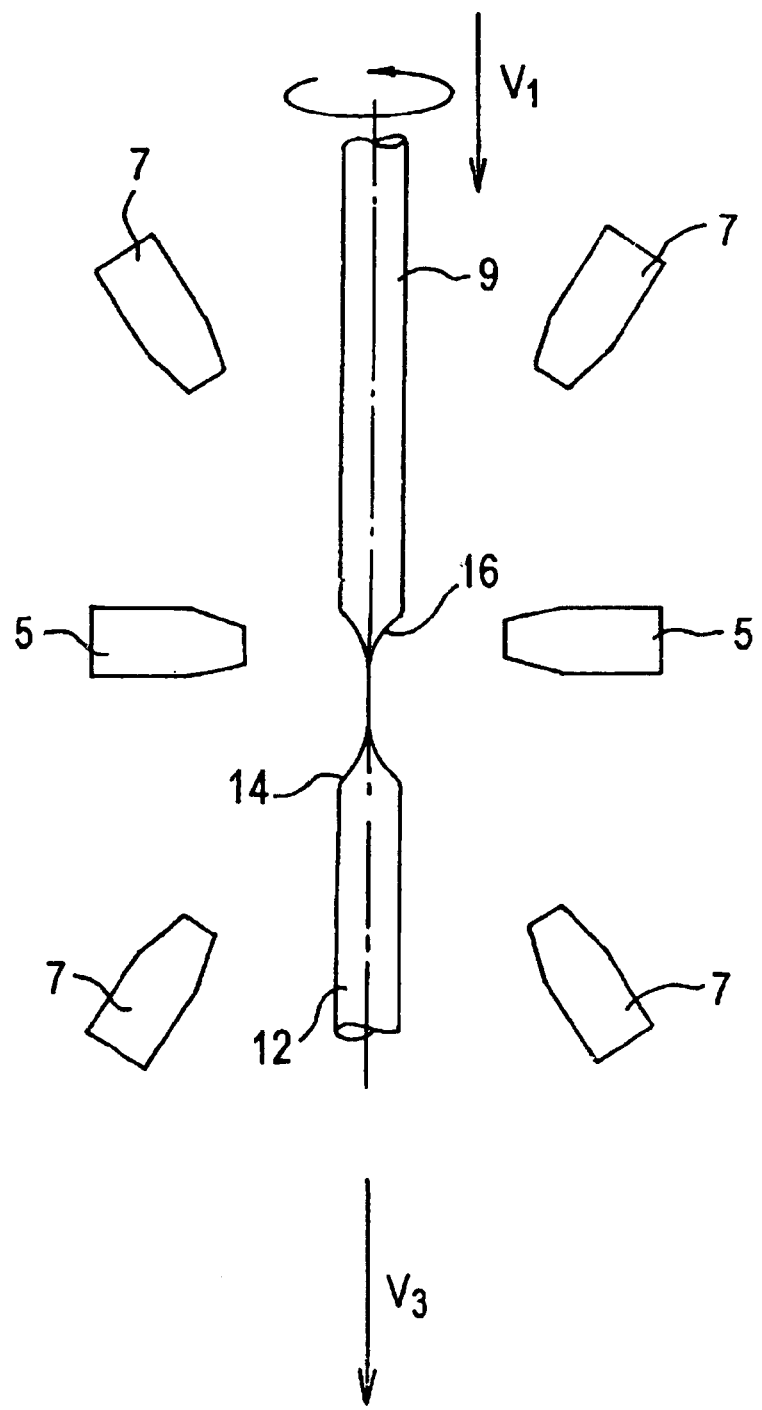
FIG. 3 is a schematic, enlarged, longitudinal sectional view showing a fusing unit according to FIG. 2 immediately after a preform rod having a tapered end is melted from the preform.

FIG. 3 depicts an apparatus according to the present invention immediately after a preform rod 12 is fused from the preform 9. The burners 5 and nozzles 7 have been temporarily turned off. The preform rod 12 moves away from preform 9 at fusion chuck take up rate, $V_3$. Rod end 14 and preform end 16 are both tapered.

The invention is more particularly described by way of examples.

EXAMPLE 1

Using an apparatus of the type shown in FIG. 1, an ingot having an outer diameter of 150 mm was attached to a rotary chuck, and drawn into a preform having an outer diameter of 60 mm at a feed rate of $V_1$ of 20 mm/minute, a take-up rate, $V_2$, of 125 mm/minute, and a fusing chuck take-up rate, $V_3$, of 150 mm. Two fusing burners of a fusing unit were arranged and opposed at an angle of 180°, and two small-size gas burner nozzles were, respectively, set at upper and lower positions relative to the fusing burners so that two burner nozzles at each position were opposed at an angle of 180°, with an angle of blowing against the preform, θ, being at 50°.

$H_2$ and $O_2$ gases were fed to the fusing burners at rates of 400 liters/minute of $H_2$ and 230 liters/minute of $θ_2$. For the prevention of silica deposition, 150 liters/minute of $O_2$ was fed to each burner nozzle.

The resultant preform rods had a length of about 1000 mm and an outer diameter of 60 mm, on which no silica cloud was deposited. Thus, no finishing fire polishing was necessary, resulting in the significant reduction of manufacturing of time. Moreover, a slight residual strain was observed, but at a level presenting no problem.

In the context of the present invention, the terms "melt" and "fuse" and their grammatical variants (e.g., fusing, fusion, melting, etc.) are used to indicate severing or parting-off a preform rod from a preform, whereby preform rods having tapered ends are produced.

EXAMPLE 2

The general procedure of Example 1 was repeated using the same drawing conditions as in Example 1, except that $H_2$ and $O_2$ were passed to the fusing burners at rates of 400 liters/minute and 230 liters/minute, respectively, and air was passed to the respective small-size gas burner nozzles at a rate of 150 liters/minute and blown against the preform at a blowing angle θ of 30°. As a result, no silica deposition was found on the resultant preform products having an outer diameter of 60 mm, with similar results as in Example 1.

EXAMPLE 3

The general procedure of Example 1 was repeated using the same drawing conditions as in Example 1, except that $H_2$ and $O_2$ were passed to the fusing burners at rates of 400 liters/minute and 230 liters/minute, respectively, and an oxyhydrogen flame in an oxygen-rich condition was blown against the preform at a blowing angle θ of 30° while passing 100 liters/minute of $H_2$ and 60 liters/minute of $O_2$ to each small-size gas burner nozzle. As a result, no deposition of silica cloud was found on preform products having an outer diameter of 60 mm, with similar results as in Example 1. Moreover, no residual strain was found in the products.

What we claim is:

1. An apparatus for melting an optical fiber preform to form preform rods having tapered ends, comprising:
   a drawing unit having a rotary chuck;
   a feeding means for feeding a mother ingot;
   an electrical furnace;
   a drawing chuck; and
   a fusing unit associated with said drawing unit, said fusing unit having a fusing burner unit and a fusing chuck, wherein said fusing unit includes a plurality of nozzles located above and below said fusing burner unit and capable of blowing an oxidation gas against a preform being drawn at a blow angle, $\theta$, relative to the passing preform, which is in the range of $20°<\theta<60°$.

2. An apparatus according to claim 1, wherein said plurality of nozzels are each comprised of a small-size burner.

* * * * *